(12) United States Patent
Reinsch

(10) Patent No.: US 6,273,153 B1
(45) Date of Patent: Aug. 14, 2001

(54) METERING AND DISPENSING PARTICULATE MATTER DIRECTLY INTO BINS

(75) Inventor: Frank G. Reinsch, Kansas City, MO (US)

(73) Assignee: Pathfinder Systems, Inc., Kansas City, MO (US)

( * ) Notice: Subject to any disclaimer, the term of this patent is extended or adjusted under 35 U.S.C. 154(b) by 0 days.

(21) Appl. No.: 09/468,732

(22) Filed: Dec. 21, 1999

(51) Int. Cl.[7] .......................................................... B65B 1/04
(52) U.S. Cl. .............................. 141/65; 141/67; 141/346; 141/383
(58) Field of Search ................................... 141/65, 67, 2, 141/18, 383–386, 346; 406/38, 39, 106, 128, 139, 144, 173, 31, 29

(56) References Cited

U.S. PATENT DOCUMENTS

| 2,026,732 | 1/1936 | Farley . |
|---|---|---|
| 2,572,862 | 10/1951 | Israel . |
| 2,578,116 | 12/1951 | White et al. . |
| 2,580,581 | 1/1952 | Niemitz . |
| 2,596,824 | 5/1952 | Scott . |
| 2,648,428 | 8/1953 | White et al. . |
| 2,674,206 | 9/1954 | Scott et al. . |
| 3,030,153 | 4/1962 | Krenke et al. . |
| 3,353,572 * | 11/1967 | Anderson et al. . |
| 3,542,250 | 11/1970 | McRitchie . |
| 3,694,037 | 9/1972 | Feder . |
| 3,809,438 | 5/1974 | Hubbard . |
| 4,260,480 | 4/1981 | Lewis et al. . |
| 4,571,143 | 2/1986 | Hellerich . |
| 4,695,205 | 9/1987 | Levine . |
| 4,793,743 | 12/1988 | Grodecki et al. . |
| 4,834,586 | 5/1989 | Depew . |
| 5,147,152 | 9/1992 | Link . |
| 5,163,786 | 11/1992 | Christianson . |
| 5,641,012 * | 6/1997 | Silversides .............................. 141/383 |
| 5,803,673 | 9/1998 | Reinsch et al. . |

FOREIGN PATENT DOCUMENTS

| 0546995 | 11/1985 | (AU) . |
|---|---|---|
| 215893 | 11/1960 | (DE) . |
| 92 01 539 | 7/1993 | (DE) . |
| 583959 | 12/1977 | (SU) . |

OTHER PUBLICATIONS

Promotional Package on planter Vac™ Systems, Feb. 1994; Blomkest, MN.

* cited by examiner

Primary Examiner—Steven O. Douglas
(74) Attorney, Agent, or Firm—Fish & Richardson P.C.

(57) ABSTRACT

A system for metering and dispensing particulate matter, such as agricultural pesticides and fertilizers, from a storage bin directly into an applicator bin, and methods of its use. The device includes a storage bin for storing a quantity of particulate matter in bulk form, a meter connected to the storage bin for controllably releasing a desired amount of the particulate matter from the storage bin, a pneumatic transport conduit for suspending the released particulate matter in a flow of gas and transporting the suspended matter to an applicator bin, and a coupler disposed at a distal end of the conduit. The coupler is adapted to provide a sealed connection between the conduit and the applicator bin as transported particulate matter is dispensed from the conduit into the applicator bin through the coupler. Because the particulate matter is dispensed directly into the applicator bin, such as the bin of an agricultural planter, directly through a sealed connection, the closed-loop pneumatic system avoids exposure of the operator to hazardous air-borne dust.

54 Claims, 8 Drawing Sheets

METERING AND DISPENSING PARTICULATE MATTER DIRECTLY INTO BINS

BACKGROUND OF THE INVENTION

This invention generally relates to a device and method for metering and dispensing precise amounts of particulate matter directly into bins. The invention is particularly applicable for dispensing dry agricultural chemicals, such as pesticides (e.g., herbicides), fertilizers and adjuvants, directly into applicator bins.

Many useful agricultural chemicals and other such products are distributed in dry bulk form, either as powders, granules or small pellets, to the farmers who ultimately use them. Prolonged exposure to high concentrations of many of these chemicals is not recommended, and direct contact should in many cases be avoided.

One useful device for metering and pneumatically transporting agricultural chemicals from a storage bin into applicator bins (e.g., bins on a planter or spreader) is disclosed in U.S. Pat. No. 5,803,673. This device meters precise quantities of particulate matter into a pneumatic air stream which transports the suspended matter through a flexible hose to a portable cyclone separator at which the matter is separated from the air stream and falls out of the bottom of the separator. The major portion of the air stream is recirculated from the separator to the storage bin through a return hose. By holding the separator over an applicator bin, the separated matter tends to fall into the applicator bin. In some instances, dry particulate matter falling from the bottom of the unsealed separator can create airborne dust that, depending on the toxicity of the material, the extent of exposure, and/or size of the dust particles, can create a health hazard.

Because of the potential health hazards associated with exposed chemicals in dry form, some planter manufacturers now provide their planter boxes with tops having self-sealing fill ports. American Cyanamid, for example, markets such a self-closing fill port. When a mating port coupler is attached, the port is opened for filling in such a way that the contents of the box are not exposed to the environment as the coupler is mated to the port. Some other planter boxes have tops with fill ports with simple, sealed covers which, when removed for filling, temporarily expose the box contents to the environment. During filling, air-borne chemical dust may be generated in the planter box by the flow and settling of the chemical, and this dust may vent to the environment before the sealed cover is replaced.

New devices and methods are sought for metering dry chemicals into agricultural applicator bins, such as planter boxes, in ways that avoid either direct contact with the chemicals or significant exposure to air-borne chemical dust. The entire contents of the above-referenced patent are hereby incorporated by reference as if fully set forth.

SUMMARY OF THE INVENTION

The invention features a system for filling applicator bins directly through a sealed coupling at the bin, by transporting metered dry chemical matter pneumatically in a procedure that substantially avoids operator exposure to the dry chemical matter.

By "particulate matter", we mean to include powdered, granular and pelletized materials that are not suspended in a liquid medium.

According to one aspect of the invention, a device for metering and dispensing particulate matter from a storage bin directly into an applicator bin includes a storage bin for storing a quantity of particulate matter in bulk form; a meter connected to the storage bin for controllably releasing a desired amount of the particulate matter from the storage bin; a pneumatic transport conduit for suspending the released particulate matter in a flow of gas and transporting the suspended matter to an applicator bin; and a coupler disposed at a distal end of the conduit. The coupler is specifically adapted to provide a sealed connection between the conduit and the applicator bin as transported particulate matter is dispensed from the conduit into the applicator bin through the coupler.

In some instances, the pneumatic transport conduit includes a flexible duct extending from the meter to a particle separator (e.g., a cyclone-type flow-through separator) having the coupler disposed at its lower end. The separator is adapted to separate the suspended matter from the flow of gas such that the separated matter falls from the separator into the applicator bin through the coupler. In some cases the separator is configured to forward the flow of gas, having separated the suspended matter from the gas, through the filter. The flow of gas can then be returned from the filter to the meter, such that the flow of gas travels in a substantially closed loop through the system.

In some embodiments, the pneumatic transport conduit includes a flexible duct extending from the meter to the coupler, such that the flow of gas and suspended matter are ejected through the coupler directly into the applicator bin. A return duct returns the flow of gas from the applicator bin to the meter through the coupler.

In some configurations, the coupler has a coupler housing with an inner tube extending through it and forming a passage for transporting the flow of gas and suspended matter into the applicator bin. The housing and inner tube define between them an annular return passage for returning the flow of gas to the meter. The inner tube of the coupler housing may be arranged to extend a distance into the applicator bin with the coupler mounted to the applicator bin, for example.

One presently preferred coupler is a cam and groove type coupler.

For some applications, the coupler is adapted to mate with a self-closing agricultural planter box coupler.

The meter, in some presently preferred embodiments, has an airlock with a multi-vaned metering rotor; an airlock drive motor for rotatably driving the metering rotor; and a controller for controlling the rotation of the airlock drive motor to release a desired quantity of the particulate matter from the storage bin. The multi-vaned rotor may have multiple vanes defining discrete pockets of known volume between them, for instance. For enhanced metering resolution, it is recommended that the pockets each have a volume of less than about 30 cubic inches (500 cubic centimeters), preferably less than about 10 cubic inches (150 cubic centimeters). One present embodiment has a pocket volume of about 25 cubic inches (400 cubic centimeters).

The controller is preferably adapted to receive an operator input representing a desired weight of matter to be released and, based upon at least this input and a stored particulate matter density value, calculate a corresponding volume of matter to be released.

In some embodiments, the controller is adapted to automatically stop releasing the particulate matter when a preset amount of matter has been released, while air continues to flow along the conduit.

In some cases, the controller is adapted to alert an operator when the preset amount of particulate matter has been released.

To help ensure that substantially all of the dispensed matter has reached the applicator bin, for example, the controller may be advantageously adapted to maintain the flow of air along the conduit for a predetermined period of time after the preset amount of matter has been released.

Some embodiments constructed according to the invention have a flow sensor disposed, for example, upstream of the meter and responsive to air flow along the conduit, for enabling operation of the The storage bin preferably includes a hopper with sides sloped at an angle of between about 45 and 60 degrees from horizontal, and may have an internal volume of between about 5 and 200 cubic feet (0.14 and 5.7 cubic meters), for example.

In some cases, a vibrator is structurally connected to the storage bin and adapted to vibrate the bin during operation to assist flow of the particulate matter into the meter.

Some constructions of the device include both a portable dispensing unit, containing the storage bin and metering device, and a portable power unit containing a blower. The power and dispensing units are connected with at least one flexible air line.

According to another aspect of the invention, a method of metering and dispensing particulate matter from a storage bin directly into an applicator bin is provided. The method includes the steps of:

(a) filling the storage bin of the device of the invention with an amount of particulate matter;

(b) sealing the storage bin to isolate the particulate matter from the surrounding environment;

(c) transporting the device to a desired location;

(d) connecting the device to an applicator bin at a sealed connection; and then (e) operating the device to dispense a metered amount of the particulate matter directly into the applicator bin through the sealed connection.

Some applications of the inventive method include entering into a controller of the device an indication of a desired quantity of particulate matter to be dispensed, or an indication of the density of the particulate matter to be released.

For some applications, the particulate matter includes or consists of an agricultural pesticide, fertilizer or adjuvant. The matter may be dispensed directly into a bin of an agricultural planter, for example.

The step of operating, in some cases, includes pneumatically transporting the particulate matter in a flow of gas through the transport conduit of the device; and returning the flow of gas, less the dispensed particulate matter, to the device. Operating the device may also include filtering the returned flow of gas in the device.

When the device includes both a portable dispensing unit containing the storage bin and metering device, and a portable power unit containing a blower, the method of the invention can also including the step of connecting the power and dispensing units connected with at least one flexible air line.

The invention can advantageously be employed to dispense particulate matter directly from a hopper into a bin of an applicator under conditions that substantially prevent such matter from becoming air-borne outside of the device. The invention has particular advantage in applications in which the particulate matter is potentially hazardous as air-borne dust, as can be the case with some commonly used agricultural chemical products. The device of the invention can be constructed to be quite portable, with some embodiments transportable by pickup truck directly into the field for coupling to bins of an agricultural planter, for example. The device can be adapted to interface with already commercialized self-sealing agricultural bin couplers, if desired, and is preferably configured such that the operator need never come into contact with the particulate matter, or with air carrying fine particles of such matter, throughout the bin-filling process. Other features and advantages will be apparent from the described embodiment and the appended claims.

DESCRIPTION OF EMBODIMENTS

Figure 1:
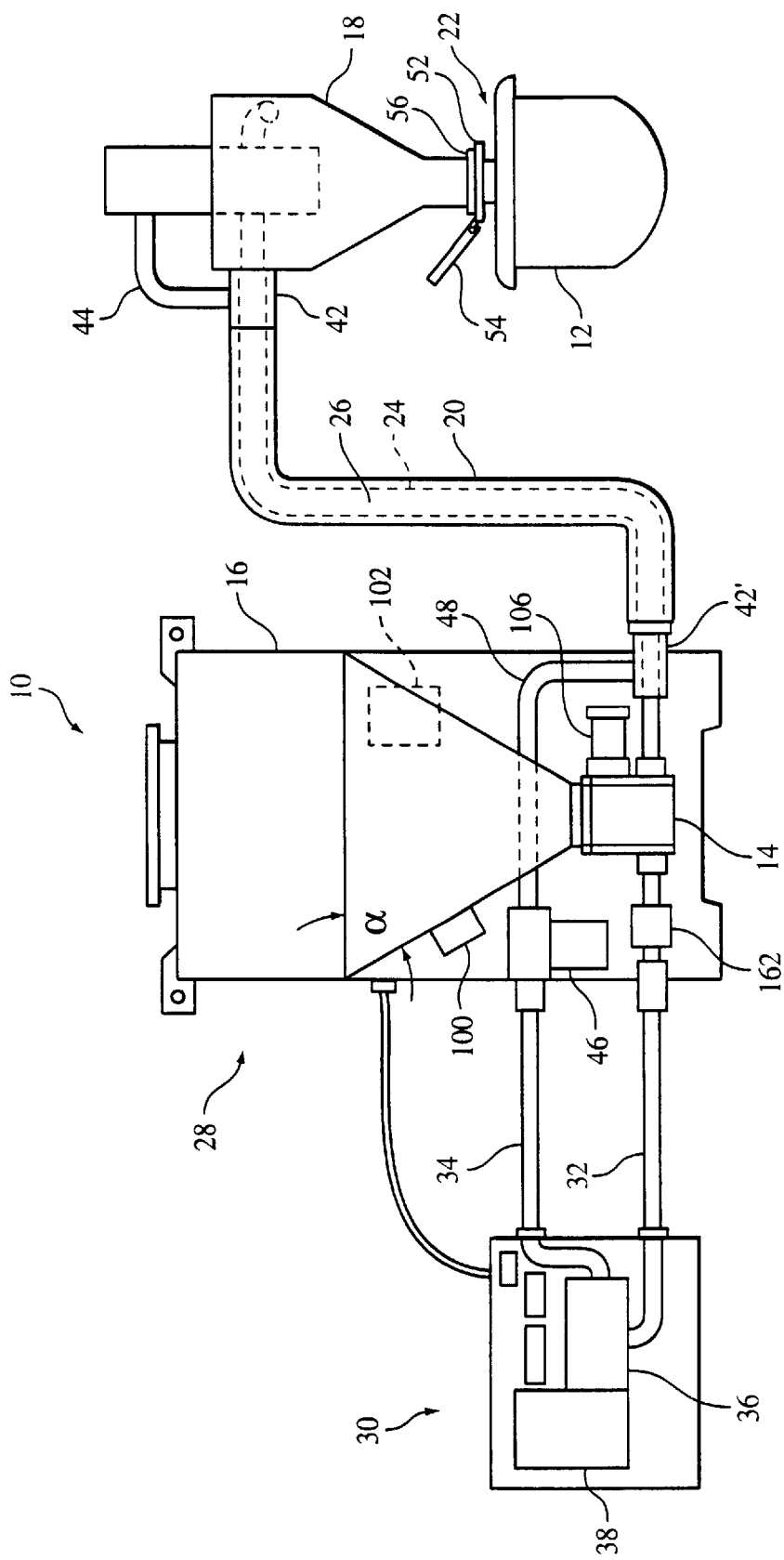
FIG. 1 is an illustration of a particulate dispensing system coupled with an applicator bin.
Figure 2:
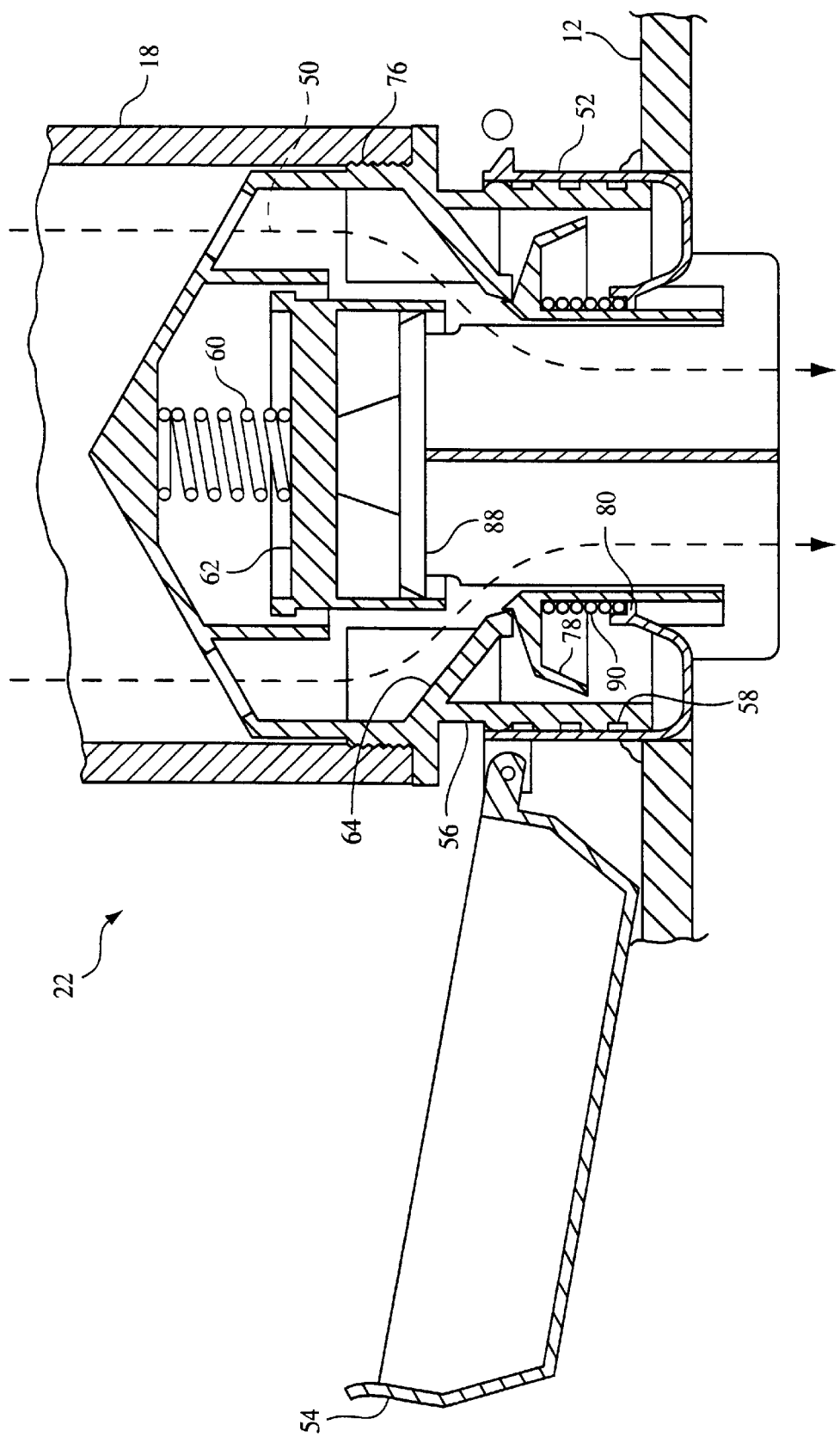
FIG. 2 is an enlarged, cross-sectional view of the open coupling between the system and bin in FIG. 1.
Figure 3:
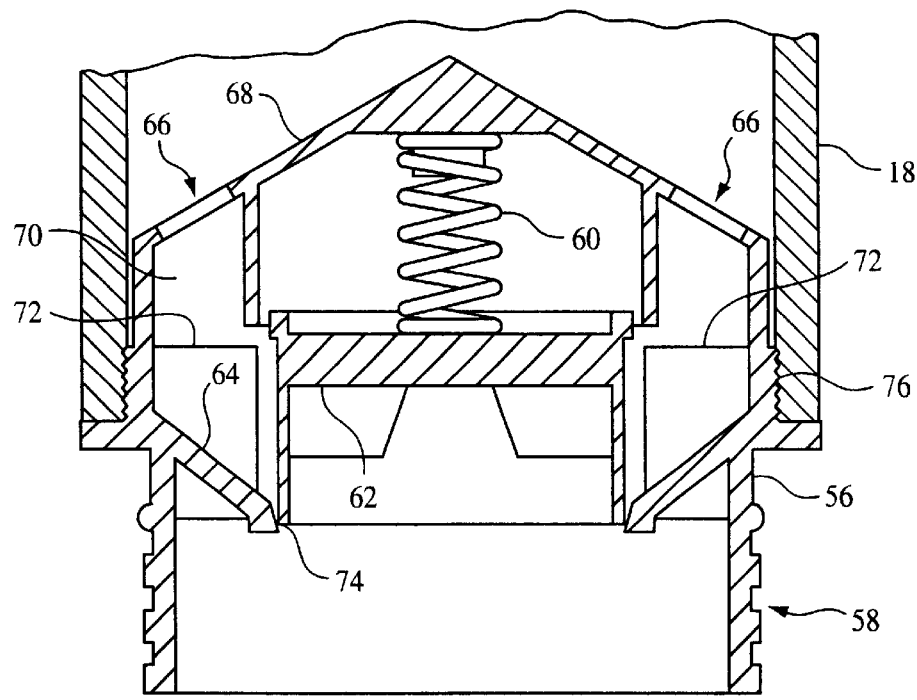
FIG. 3 is a cross-sectional view of the upper coupler, in its normally closed position.
Figure 4:
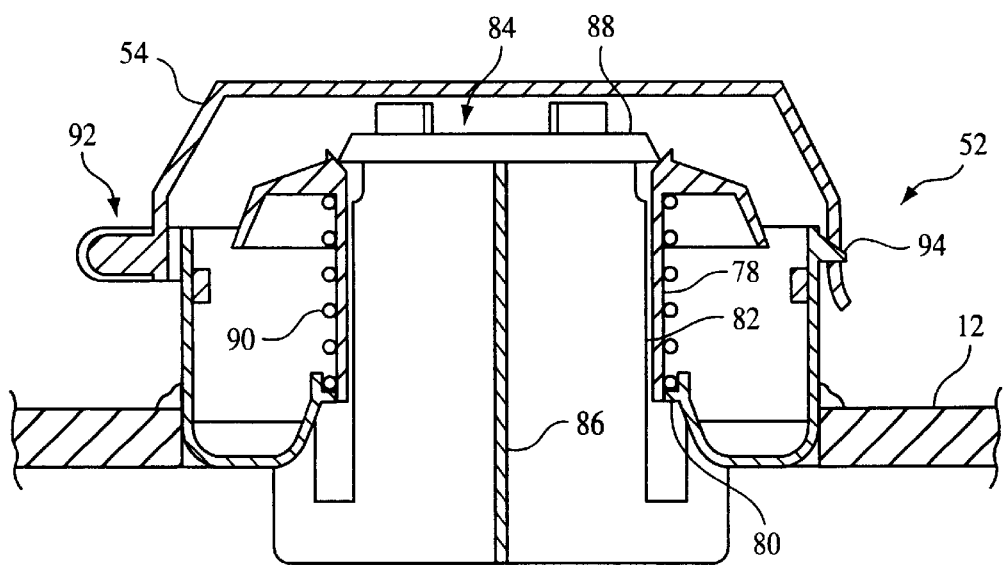
FIG. 4 is a cross-sectional view of the lower coupler, in its normally closed position.

Referring to FIG. 1, a pesticide-dispensing device 10 is shown connected to an applicator bin 12, such as a fertilizer or pesticide bin of a multi-row agricultural planter. Device 10 pneumatically conveys particulate matter, such as dry pesticide or fertilizer or the like, from a meter 14 at the bottom of a storage bin 16 of the device to a cyclone separator 18 above applicator bin 12 along a central passage 26 of a flexible hose 20. At cyclone separator 18 the particulate matter is separated from its transporting flow of gas and falls into bin 12 through a sealed coupling 22, with the flow of gas returning along an annular passage 24 within hose 20.

Connected to bin 12 at coupling 22, the device 10 provides a closed-loop pneumatic conveyance system, as the flow of air that transports the particulate matter is recycled through the device rather than exhausted to the atmosphere. This provides great advantages when the matter being dispensed is hazardous or otherwise poses a health risk with excessive exposure to the operator, for example. In the embodiment illustrated in FIG. 1, the device 10 has a dispensing unit 28 and a power unit 30 connected by supply and return air hoses 32 and 34, respectively. A positive displacement (PD) blower 36 in power unit 30 is driven by a gas engine 38 to supply compressed air at a delivery pressure of about 3 pounds per square inch through hose 32 to dispensing unit 28, where it is routed through a blow-through air lock 14 which meters particulate matter from storage bin 16, and then through hose 20 to cyclone separator 18. At a coupling 42 connecting hose 20 to the separator, the flow of air containing the particulate matter is injected straight into the side of the separator, to be swirled about inside the cyclone separator to centrifugally separate the particulate matter from the air flow, whereas the return air flow is ported through a short tube 44 extending from the core of the separator. Back at the dispensing unit 28, the return air stream is routed from a similar coupling 42' to a HEPA filter 46 through a hose segment 48 inside the dispensing unit. The filtered return air stream proceeds from filter 46 to compressor 36 through return hose 34, completing its closed loop cycle. As there are no unsealed connections along its path, or at bin coupling 22, there is no opportunity for dust of the particulate matter being dispensed into bin 12 to be released into the atmosphere. It is particularly advantageous that the connection at bin coupling 22 is sealed during operation, even though substantially none of the transporting air stream enters bin 12, as the particulate matter falling into other particulate matter in bin 12 can generate a fair amount of air-borne dust. Without a substantially sealed coupling 22 (e.g., if the particulate matter is allowed to fall exposed to atmospheric air on its way from the separator to the bin, such as would occur if the separator were simply suspended over a gaping hole in the top of the bin), displaced air from bin 12 can carry such generated dust into the atmosphere where it can be inhaled by the operator. Coupling 22 preferably provides an airtight connection during operation, for maximum protection against releasing air-borne dust at bin 12, but for some applications and some dispensed compounds, a relatively small amount of leakage is acceptable. When the transporting stream of air is not flowing, such as while the connection to bin 12 is being made or broken, sealing coupling 22 is less critical. Optimally, coupling 22 would form a sealed connection at the top of bin 12 before releasing the seal at the bin opening.

One presently preferred configuration for bin coupling 22 is illustrated in FIGS. 2–4. Coupled as shown in FIG. 2, coupling 22 provides a clear path 50 for particulate matter to fall from separator 18 into bin 12. Coupling 22 includes a lower coupler 52 that is permanently mounted in the upper surface of bin 12, such as by welding or adhesive or suitable fasteners, with a hinged cover 54 that pivots away to the position shown in FIG. 2 for access to lower coupler 52. Coupling 22 also includes an upper coupler 56 attached to the lower end of separator 18. Upper and lower couplers 56 and 52 have mating cam lock features for a twist-to-lock connection at 58 that, although not providing an air-tight seal, forms a sufficiently restrictive labyrinth, in combination with other interior restrictions described below, that no substantial amount of dust escapes through the twist-to-lock connection during operation.

Disconnected from the lower coupler, upper coupler 56 automatically closes to inhibit communication between the interior of separator 18 and the surrounding environment, as shown in FIG. 3. A compression spring 60 holds a plunger cup 62 downward against the inner edge of flange 64, blocking the opening bounded by flange 64. When upper coupler 56 is mated to the lower coupler, plunger cup 62 is forced upward against spring 60, allowing open communication between the interior of separator 18 and the lower coupler along a path through a series of holes 66 in coupler housing cap 68, an annular passage 70 between the coupler housing cap and upper coupler housing 71, between radial fins 72 and through the hole bounded by the rim 74 of flange 64. Plunger cup 62 is shown in this elevated position in FIG. 2. Coupler housing cap 68 is secured about its periphery to the upper edge of upper coupler housing 71, such as by staking tabs in associated slots (not shown), and upper coupler housing 71 is attached to the lower end of separator 18 at a threaded connection 76.

Lower coupler 52 is shown in its normally closed condition in FIG. 4. A movable shroud 78 is slidingly disposed between an inwardly directed, lower radial housing flange 80 and the shank 82 of an inner housing pedestal 84 that is formed by four radial fins 86 extending from a common vertical axis and capped with a circular disk 88. A compression spring 90 biases shroud 78 upward against disk 88 such that shroud 78 extends over the entire distance between disk 88 and flange 80 to inhibit communication between the interior of bin 12 and the atmosphere. When not in use, lower coupler 52 is covered by cover 54 attached at hinge 92 and latch 94.

With upper and lower couplers 56 and 52 locked together to form coupling 22, as shown in FIG. 2, shroud 78 of the lower coupler 52 is pushed downward by the rim of flange 64 of the upper coupler 56 against spring 90, and the plunger cup 62 of the upper coupler 56 is pushed upward against spring 60 by the disk 88 of the lower coupler, to open communication path 50 through the coupling. Note that, with the coupling formed as shown in FIG. 2, the only potential leak paths between flow path 50 and the atmosphere outside the coupling, assuming the integrity of threaded connection 76, are either between shroud 78 and flange 64, the engaging surfaces of which are held together by the force of spring 90, or through the small slip-fit gap between lower flange 80 and shroud 78, in series with cam lock connection 58. If more complete sealing is required, those of ordinary skill will understand how to modify connection 58 to include a more positive sealing mechanism, such as an O-ring (not shown).

Referring back to FIG. 1, a sealed hopper or bin 16 is mounted within the outer structure of dispensing unit 28. Hopper 16 is shaped to promote gravitational feeding of bulk materials into the metering device 14 located at its lower end. We have determined that a wall slope angle "" of between about 45 and 60 degrees will work for many particle shapes and sizes, 60 degrees being preferable for powders and other very fine particles. To assist with the flow of the bulk material into metering device 14, an electric vibrator 100, such as a model DC-300-24V available from Vibco, may be firmly attached to hopper 16 to vibrate the hopper and induce downward flow. Behind a control panel 102 is a programmable electronic controller (not shown) that controls the operation of unit 28, including vibrator 100 and metering device 14. Electric power is provided by a pair of 12 VDC, 17 amp-hour rechargeable batteries 104 in power unit 30.

FIGS. 5 and 6 better illustrate the structural detail of meteling device 14. A ⅛ horsepower, 32 RPM, 24 VDC gear motor 106, such as model PR990235, available from Leeson, drives the multi-vaned rotor 108 of a bulk material transfer gate 110, such as the airlock described in U.S. Pat. No. 5,803,673. Gate 110 has a cast aluminum housing 112 and end caps 114, and an injection molded "DELRIN" rotor 108 with ten integrally molded vanes 116 that define, in cooperation with housing 112 and end caps 114, ten discrete pockets 118 that transport bulk material from upper opening 120, open to the hopper, to the lower side of the transfer gate, where it is flushed from the pockets by the flow of air or other transport gas flowing from inlet 40 to outlet 122. The rotor is supported on integrally molded axial projections 126 protruding from each end of the rotor through corresponding holes in end caps 114. Rotor 108 defines a keyed central hole for receiving the motor shaft that drives the rotor. PTFEencapsulated neoprene O-rings 130 provide for dynamic sealing between rotor 108 and end caps 114 during operation. A running clearance of about 0.010 inch (0.26 millimeter) is provided axially between the rotor and each end cap, and radially between the rotor and housing 112. We have found that this clearance results in acceptably low leakage about the vanes for most intended bulk materials and at operating pressures. In this embodiment, rotor 108 has an overall diameter of about 7 inches (18 centimeters) and a length of about 7 inches (18 centimeters).

All of pockets 118 are of similar volume. In this embodiment, each pocket 118 has a volume of about 25 cubic inches (400 cubic centimeters), which is effectively the "resolution" of the dispensing system. Of course, gates 110 defining discrete pockets of other shapes and volumes are considered within the scope of this invention. For example, pocket volumes as low as 3 cubic inches (50 cubic centimeters) provide even finer resolution. Ideally, each pocket is completely and sequentially filled with bulk material from opening 120, and completely empties into the transporting air flow. To help ensure complete pocket filling and emptying, motor 106 may be adapted to impart a vibration to gate 110. For embodiments having a separate vibrator (100, FIG. 1), the gate may be structurally coupled to the vibrator to enhance pocket filling. Rotor positional feedback to the controller is provided by rare earth magnets 134 embedded in the vanes of the rotor, which are sensed by a hall effect sensor 136 in the housing end cap adjacent the motor. Alternatively, motors 106 with built-in positional feedback systems may be employed. As rotor 108 rotates, pulses from hall effect sensor 136 inform the controller of the passage of each vane, and therefore of the emptying of each pocket. The controller monitors these pulses until it has determined that the desired number of pockets of material, as determined from operator input and known pocket volume, have been dispensed. Once the controller stops applying power to motor 106, friction and internal damping generally cause the motor to coast only a few degrees before coming to a stop, providing for an accuracy of +/-1 pocket or better in the total amount released. Better accuracies may be provided by equipping the motor with braking means (not shown) to positively stop rotation of the rotor at a desired vane increment.

It is preferred that gate 110 not be operated to dispense materials before an air flow has been established through gate 110. In other words, it is preferable that a threshold flow rate through meter 14 be established before motor 106 begins to rotate rotor 108.

Figure 7:
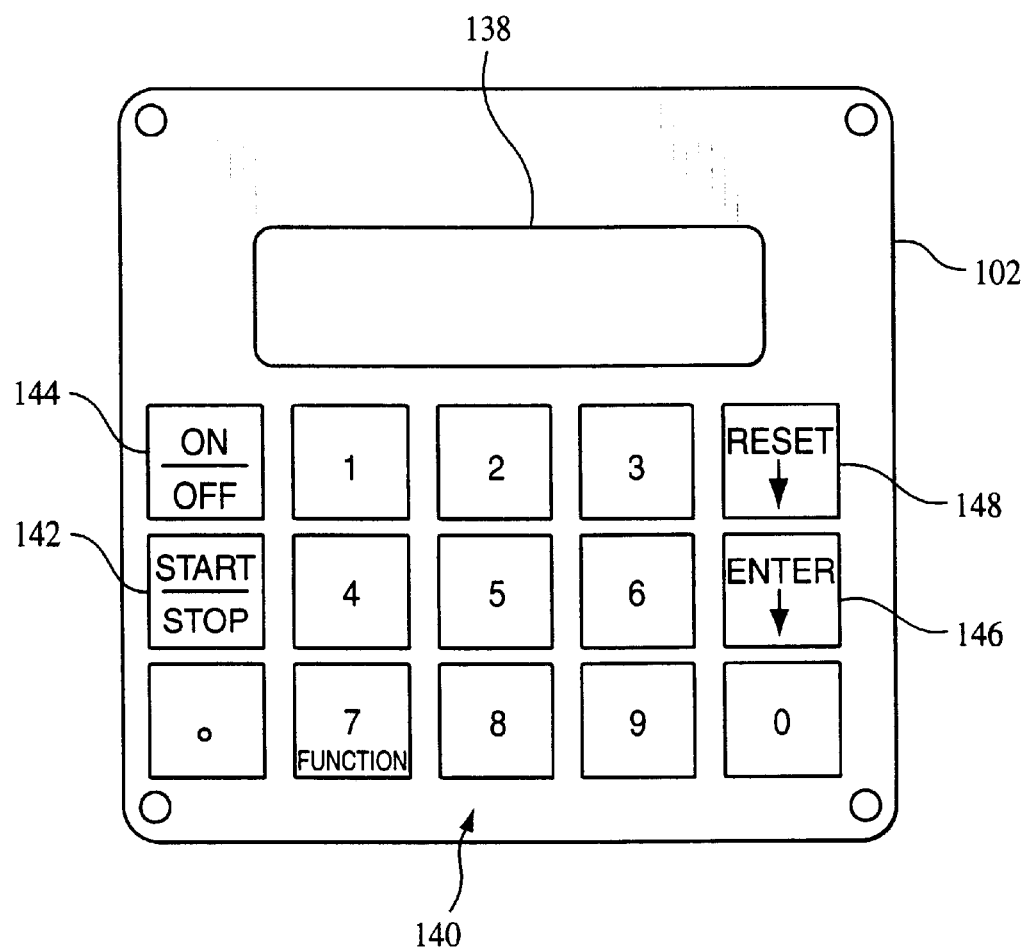
FIG. 7 is an illustration of the control panel of the inductor.

Referring to FIG. 7, control panel 102 has a digital display 138 for displaying textual information, and a keypad 140 for operator input. Besides a typical 10 number keys and a decimal key, keypad 140 includes a "START/STOP" key 142, an "ON/OFF" key 144, an "ENTER" key 146 and a "RESET" key 148. "ON/OFF" key 144 controls system power, as its name implies. After entering a set point, the operator pushes the "START/STOP" key 142 to begin automatic release of the material. During operation, pushing the "START/STOP" key 142 pauses the release of material and initiates an audible alarm and appropriate visual display indicating that release has been interrupted. "ENTER" key 146 is used for entering user input, such as data and passwords, and "RESET" key 148 is for acknowledging and resetting alarms or clearing keyed values. In addition, there are four additional functions performed by pushing various keys in combination with key "7", sub-labeled "FUNCTION". Holding key "7" while pushing key "1", for example, displays the calibration factor (CF) for three seconds. This calibration factor represents the density of the bulk material, in pounds per pocket. Holding key "7" while pushing key "3" displays current battery voltage (VDC). Holding key "7" while pushing either the "RESET" or "ENTER" keys will either raise or lower, respectively, the contrast of display 138. If desired, a three-conductor serial controller cable input jack (not shown) may be provided for operation of the dispensing unit from a pendant controller or keypad.

Three password levels are provided for various function authorizations. A typical user will be provided with a first level password that enables the entry of set points and very basic system operation. A second level password allows the user to change inventory parameters, calibration factors, or perform self-calibration. For self-calibration, the user will direct the system to dispense a given amount (e.g., weight) of material. The user then weighs the dispensed material with appropriate weighing means (not shown) and enters the weight of the material actually dispensed. The controller then adjusts its calibration factor accordingly. An example of changing inventory parameters is changing a value representing the total amount of bulk material presently contained within the hopper. For example, when filling the hopper with bulk material, a dealer may enter into the controller the total weight of material supplied. During operation, the controller continuously subtracts from this value the weight of material dispensed. When the controller determines that all of the material originally supplied has been dispensed (i.e., when the total weight register reads "0"), any further dispensing of material by the end user is disallowed. This safeguard is particularly important for enabling the dealer to reliably track the overall amount of material dispensed through the system, for example. A third level password authorizes more advanced adjustments, such as changing the motor speed, timer values or alarm points.

Figure 6:
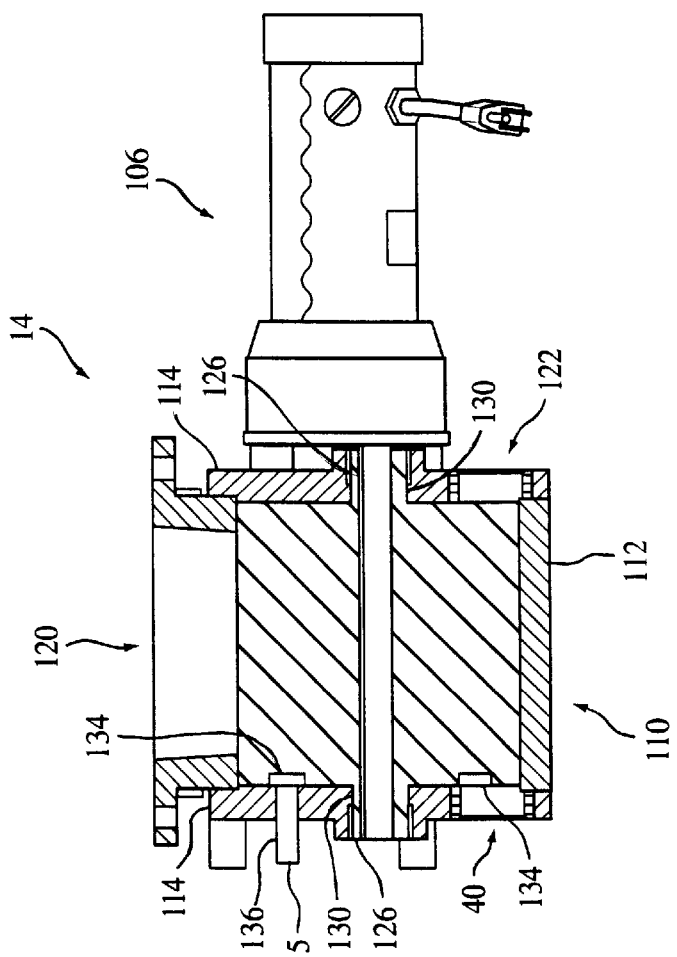
FIG. 6 is a cross-sectional view, taken along line 6—6 in FIG. 5, with the drive motor not sectioned.
Figure 5:
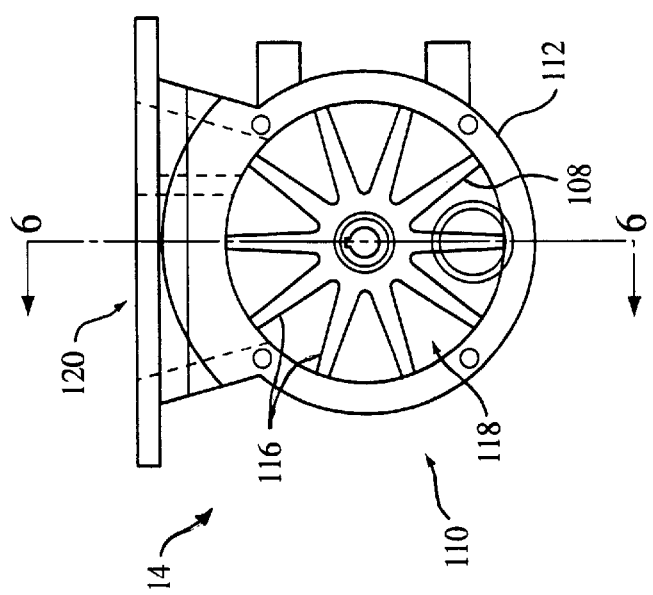
FIG. 5 is a side view of the metering device, with the end caps of the meter housing transparent to show the internal rotor.
Figure 8:
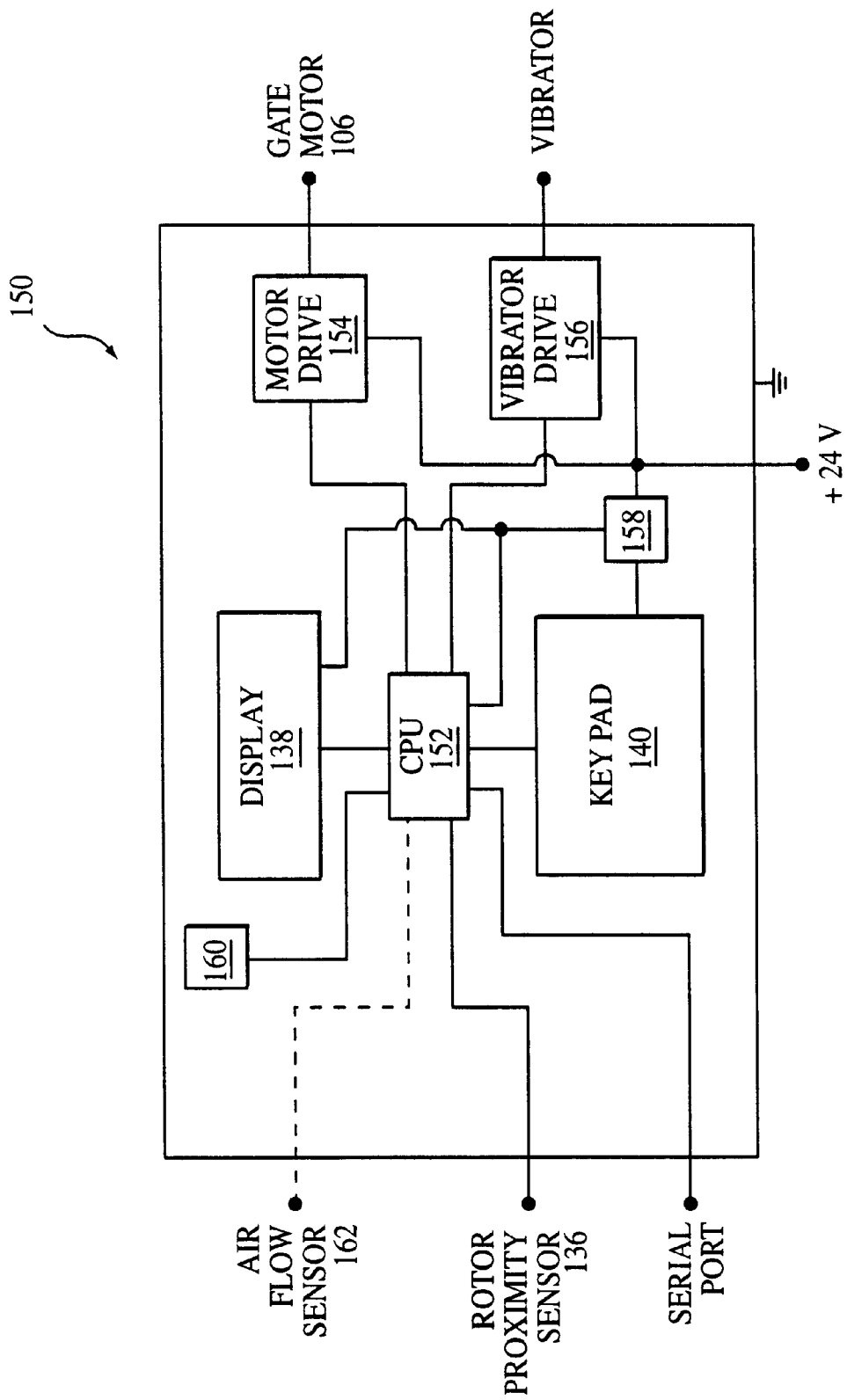
FIG. 8 is an upper level functional schematic of the controller.

Referring to FIG. 8, system controller 150 includes a programmable microprocessor CPU 152 that is programmed to perform all data manipulations in controller 150. CPU 152 receives input from the vane-sensing hall effect sensor 136 (FIG. 6), keypad 140 and, in some embodiments, a serial port. Based upon these inputs, CPU 152 drives motor drive circuitry 154 to pulse-width modulate high side power to gate motor 106 (FIG. 6) to drive the gate rotor and dispense product. At the same time, CPU 152 triggers a power switch 156 to turn on the vibrator, if so equipped. A 5V voltage regulator 158 steps battery voltage down to power the electronic controller components. Display 140 is a two row, 16 character per row, backlit LCD display via which the controller communicates visually with the operator. In addition, a buzzer 160 gives an audible alarm when triggered by the CPU.

Figure 9:
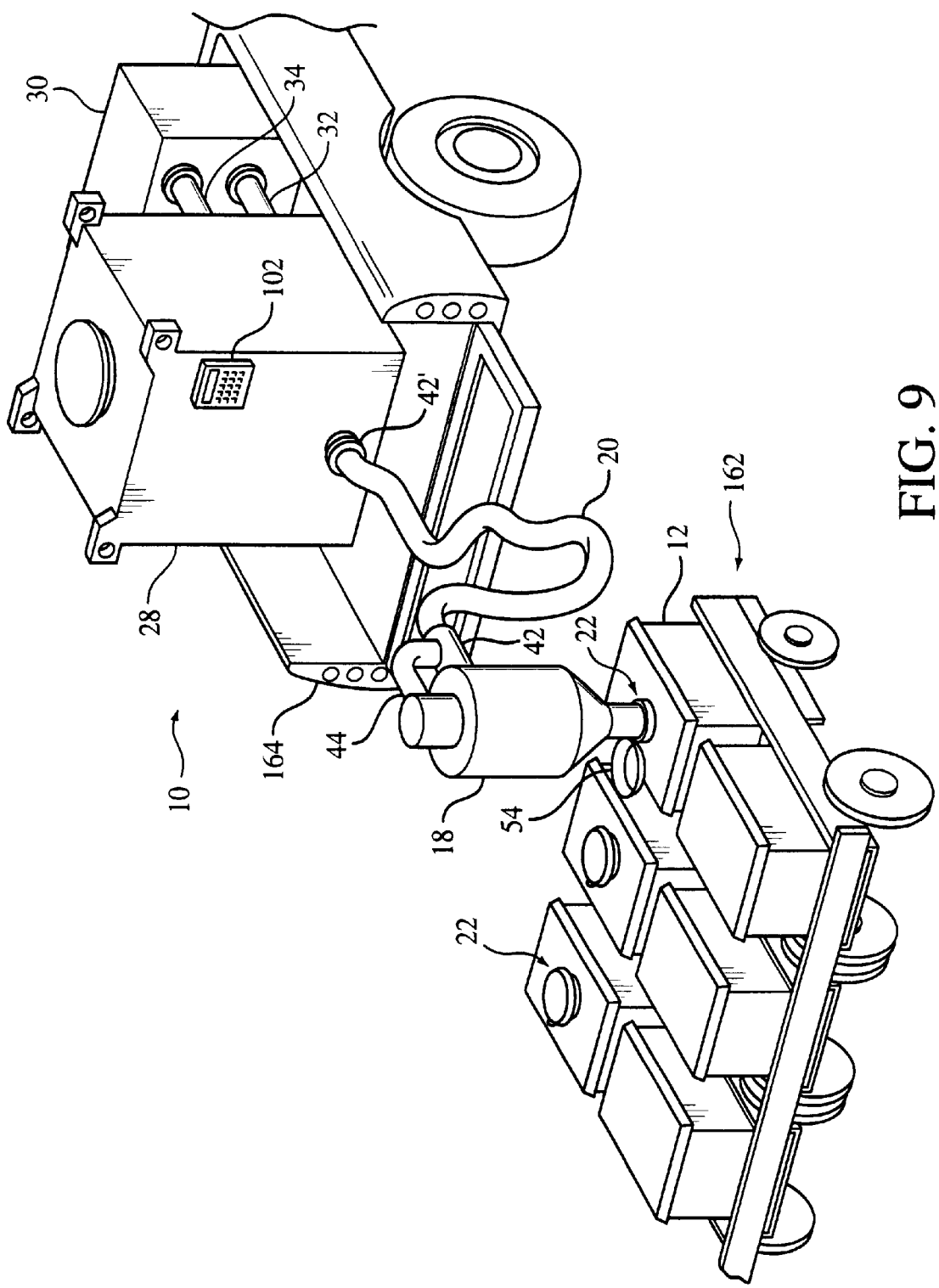
FIG. 9 illustrates the dispensing system being employed to fill bins of an agricultural planter.

FIG. 9 shows the dispensing device 10 connected to one of the auxiliary bins 12 of a multi-row agricultural planter 162, for dispensing a metered quantity of fertilizer, for example, into each auxiliary bin. The dispensing and power units 28 and 30 are shown connected and carried in the bed of a pickup trick 164, so as to be easily transported into the field or between different planters. After the cyclone separator 18 has been secured to the bin as shown, the operator keys into the control panel 102 a desired quantity of material to be dispensed. When the flow of air through dispensing device 28 has been established and sensed by the controller, for instance by an optional in-line flow sensing device 162 (FIG. 1), the dispensing meter is activated and begins to release the particulate matter, at a controlled rate, into the pneumatic transport stream. The meter continues to dispense material until the desired amount of material has been dispensed. Preferably, the flow of air is continued for a predetermined length of time after the meter has stopped dispensing material, so as to clear hose 20, cyclone separator 18 and bin 12 of air-borne dust. The amount of time necessary to sufficiently evacuate dust from the system will depend on the particulate matter being dispensed and the pneumatic flow rate, among other things, but with typical agricultural products a post-metering evacuation of about 9 seconds has been found to be sufficient.

Figure 10:
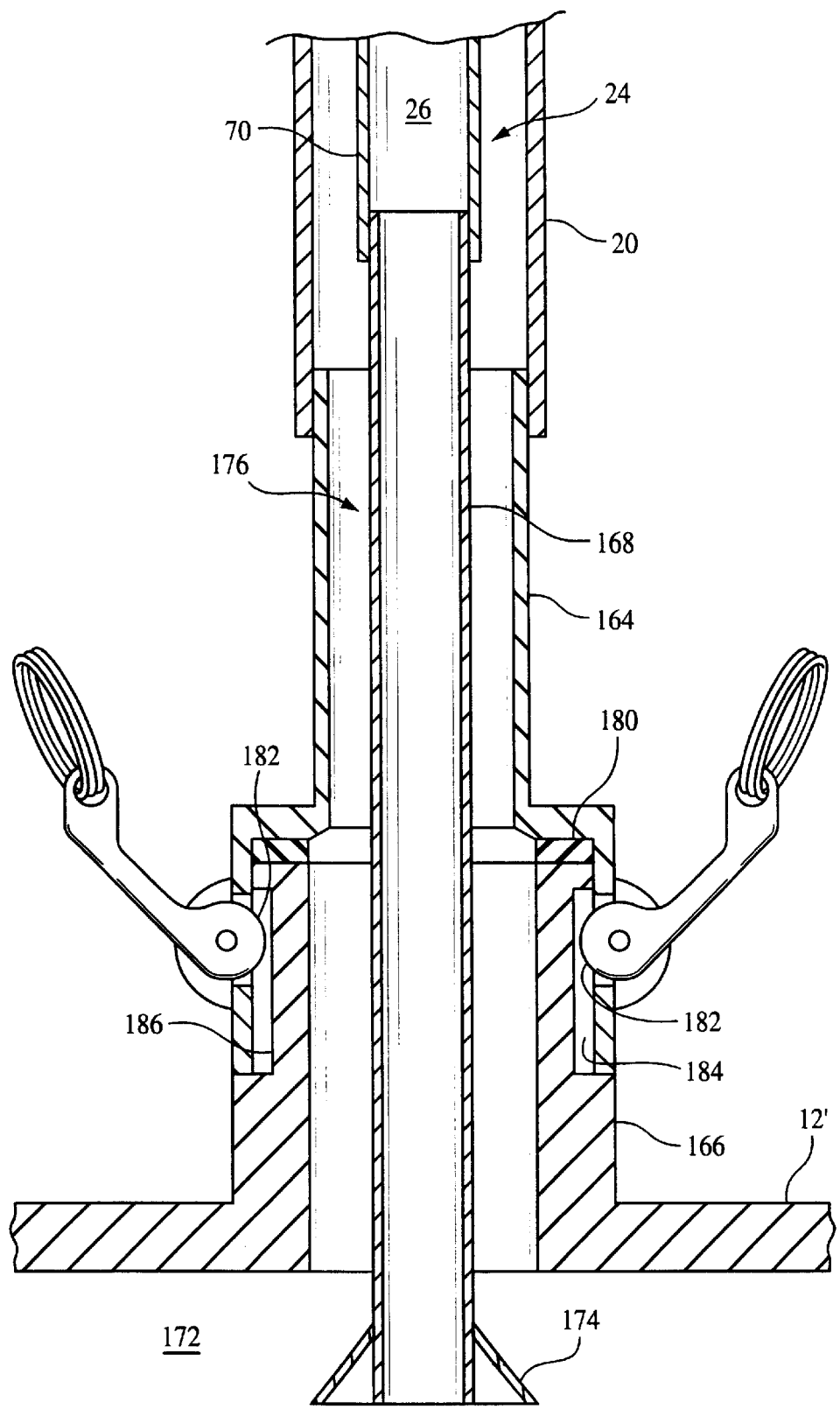
FIG. 10 is a cross-sectional illustration of an alternate bin coupling.

In another embodiment, the flow of gas carrying the particulate matter is blown directly into the applicator bin. This embodiment requires no cyclone separator, but has instead a bin coupling 22' as shown in FIG. 10. The dual hose 20 from the dispensing unit is attached, such as by hose clamps or other suitable hardware (not shown), to an upper coupler 164 which is lowered over a mating lower coupler 166 extending upward from bin 12'. Upper coupler 164 has an inner tube 168 that is attached to the inner conduit 170 of hose 20, through which the stream of gas carrying the particulate matter is injected into bin 12'. The lower end of tube 168 extends down into the interior cavity 172 of bin 12', and has a frustoconical shroud 174 that helps to inhibit particulate matter just leaving the lower end of tube 168 from being immediately sucked up into the return flow of gas, which is pulled up into the annular space 176 around inner tube 168 and back through annular hose passage 24 to the dispensing unit. A gasket 180 between abutting surfaces of upper and lower couplers 164 and 166 provides a sufficient dust seal during operation.

Once lowered over lower coupler 166, upper coupler 164 is locked in place by a pair of cam levers 180 that are manually pivoted downward to extend their cam surfaces 182 radially inward into a circumferential channel 184 in the lower coupler and to engage their cam surfaces 182 against vertical surface 186. After use, levers 180 are pulled upward to release the upper coupler 164, which is then lifted from bin 12'. Such couplings are well known in industry and are frequently employed in other applications.

One of the principle differences between the coupling 22, as shown in FIG. 2, and coupling 22' as shown in FIG. 10 is that coupling 22 maintains an effective dust seal at all times. With coupling 22', on the other hand, the bin contents are exposed to atmosphere immediately before upper coupler 164 is lowered into place, and immediately after it is removed. Thus, coupling 22 may be more highly regarded for use with more caustic chemicals. One of the advantages of coupling 22', however, is that it is simple in construction, lightweight, and difficult to clog. Other types of couplings will also be understood to provide advantages in various applications of this invention, and those that maintain a dust-inhibiting seal during operation will provide the best overall protection against unwanted operator exposure.

Those familiar with dispensing reactive agricultural chemicals will understand how to select proper materials for the various components of these illustrated couplings, and of the other system hardware that will come into repeated contact with the chemical compounds. While stainless steels will generally be acceptable for most applications, aluminum, steel and even certain moldable plastics, such as polypropylene and polyethylene, will work in many instances.

Other embodiments will be understood to be within the scope of the following claims.

What is claimed is:

1. A device for metering and dispensing particulate matter from a storage bin directly into an applicator bin, the device comprising a storage bin for storing a quantity of particulate matter in bulk from;

a meter connected to the storage bin for controllably releasing a desired amount of the particulate matter from the storage bin;

a pneumatic transport conduit for suspending the released particulate matter in a flow of gas and transporting the suspended matter to an applicator bin; and a coupler disposed at a distal end of the conduit, the coupler adapted to provide a sealed connection between the conduit and the applicator bin through the coupler;

wherein the pneumatic transport conduit comprises a flexible duct extending from the meter to a particle separator having said coupler disposed at a lower end thereof, the separator adapted to seperate the suspended matter from the flow of gas such that the seperated matter falls from the separator into the applicator bin through the coupler.

2. The device of claim 1 further comprising a filter, the separator configured to forward the flow of gas, having separated the suspended matter therefrom, through the filter.

3. The device of claim 2 wherein the flow of gas is returned from the filter to the meter, such that the flow of gas travels in a substantially closed loop through the system.

4. The device of claim 1, wherein said separator comprises a cyclone-type flow-through separator.

5. A device for metering and dispensing particulate matter from a storage bin directly into an applicator bin, the device comprising a storage bin for storing a quantity of particulate matter in bulk form;

a meter connected to the storage bin for controllably releasing a desired amount of the particulate matter from the storage bin;

a pneumatic transport conduit for suspending the released particulate matter in a flow of gas and transporting the suspended matter to an applicator bin; and a coupler disposed at a distal end of the conduit, the coupler adapted to provide a sealed connection between the conduit and the applicator bin as transported particulate matter is dispensed from the conduit into the applicator bin through the coupler;

wherein the pneumatic transport conduit comprises a flexible duct extending from the meter to said coupler, such that the flow of gas and suspended matter are ejected through said coupler directly into the applicator bin, the device further comprising a return duct for returning the flow of gas from the applicator bin to the meter through the coupler.

6. The device of claim 5 wherein the coupler comprises a coupler housing with an inner tube extending therethrough and forming a passage for transporting the flow of gas and suspended matter into the applicator bin, the housing and inner tube defining therebetween an annular return passage for returning the flow of gas to the meter.

7. The device of claim 6 wherein the inner tube of the coupler housing is arranged to extend a distance into the applicator bin with the coupler mounted to the applicator bin.

8. The device of claim 5 wherein the coupler is a cam and groove type coupler.

9. The device of claim 5 wherein the coupler is adapted to mate with a self-closing agricultural planter box coupler.

10. The device of claim 5, wherein the storage bin comprises a hopper with sides sloped at an angle of between about 45 and 60 degrees from horizontal.

11. The device of claim 10 wherein the hopper has an internal volume of between about 5 and 200 cubic feet (0.14 and 5.7 cubic meters).

12. The device of claim 5, further comprising a vibrator structurally connected to the storage bin and adapted to vibrate the bin during operation to assist flow of the particulate matter into the meter.

13. The device of claim 5, comprising
a portable dispensing unit containing the storage bin and metering device, and
a portable power unit containing a blower; the power and dispensing units connected with at least one flexible air line.

14. A device for metering and dispensing particulate matter from a storage bin directly into an applicator bin, the device comprising
a storage bin for storing a quantity of particulate matter in bulk form;
a meter connected to the storage bin for controllably releasing a desired amount of the particulate matter from the storage bin;
a pneumatic transport conduit for suspending the released particulate matter in a flow of gas and transporting the suspended matter to an applicator bin; and
a coupler disposed at a distal end of the conduit, the coupler adapted to provide a sealed connection between the conduit and the applicator bin as transported particulate matter is dispensed from the conduit into the applicator bin through the coupler;
wherein said meter comprises
an airlock having a multi-vaned metering rotor;
an airlock drive motor for rotable driving the metering rotor; and
a controller for controlling the rotation of the airlock drive motor to release a desired quantity of the particulate matter from the storage bin.

15. The device of claim 14, wherein the multi-vaned rotor has multiple-vanes defining therebetween discrete pockets of known volume.

16. The device of claim 15, wherein the pockets each have a volume of less than about 30 cubic inches (500 cubic centimeters).

17. The device of claim 16, wherein the pockets each have a volume of about 25 cubic inches (400 cubic centimeters).

18. The device of claim 17, wherein the pockets each have a volume of less than about 10 cubic inches (150 cubic centimeters).

19. The device of claim 14, wherein the controller is adapted to receive an operator input representing a desired weight of matter to be released and, based upon at least this input and a stored particulate matter density value, calculate a corresponding volume of matter to be released.

20. The device of claim 14, wherein the controller is adapted to automatically stop releasing the particulate matter when a preset amount of matter has been released, while air continues to flow along the conduit.

21. The device of claim 20, wherein the controller is adapted to alert an operator when the preset amount of particulate matter has been released.

22. The device of claim 20, wherein the controller is adapted to maintain the flow of air along the conduit for a predetermined period of time after the preset amount of matter has been released.

23. The device of claim 14 wherein the coupler is a cam and groove type coupler.

24. The device of claim 14 wherein the coupler is adapted to mate with a self-closing agricultural planter box coupler.

25. The device of claim 14, wherein the storage bin comprises a hopper with sides sloped at an angle of between about 45 and 60 degrees from horizontal.

26. The device of claim 25 wherein the hopper has an internal volume of between about 5 and 200 cubic feet (0.14 and 5.7 cubic meters).

27. The device of claim 14, further comprising a vibrator structurally connected to the storage bin and adapted to vibrate the bin during operation to assist flow of the particulate matter into the meter.

28. The device of claim 14, comprising
a portable dispensing unit containing the storage bin and metering device, and
a portable power unit containing a blower; the power and dispensing units connected with at least one flexible air line.

29. A device for metering and dispensing particulate matter from a storage bin directly into an applicator bin, the device comprising
a storage bin for storing a quantity of particulate matter in bulk form;
a meter connected to the storage bin for controllably releasing a desired amount of the particulate matter from the storage bin;
a pneumatic transport conduit for suspending the released particulate matter in a flow of gas and transporting the suspended matter to an applicator bin;
a coupler disposed at a distal end of the conduit, the coupler adapted to provide a sealed connection between the conduit and the applicator bin as transported particulate matter is dispensed from the conduit into the applicator bin through the coupler; and
a flow sensor responsive to air flow along the conduit, for enabling operation of the meter only in the presence of a desired amount of air flow.

30. The device of claim 29, wherein the flow sensor is disposed upstream of the meter.

31. A method of metering and dispensing particulate matter, the method comprising:
providing a device comprising
a storage bin for storing a quantity of particulate matter in bulk form;
a meter connected to the storage bin for controllably releasing a desired amount of the particulate matter from the storage bin;
a pneumatic transport conduit for suspending the released particulate matter in a flow of gas and transporting the suspended matter to an applicator bin; and
a coupler disposed at a distal end of the conduit, the coupler adapted to provide a sealed connection between the conduit and the applicator bin as transported particulate matter is dispensed from the conduit into the applicator bin through the coupler;
filling the storage bin of the device with an amount of particulate matter;
sealing the storage bin to isolate the particulate matter from the surrounding environment;
transporting said device to a desired location;
connecting the device to an applicator bin at a sealed connection; and
operating the device to dispense a metered amount of the particulate matter directly into the applicator bin through the sealed connection, including entering into a controller of the device an indication of the density of the particulate matter to be released.

32. The method of claim 31, wherein operating the device includes entering into a controller of the device an indication of a desired quantity of particulate matter to be dispensed.

33. The method of claim 31, wherein the particulate matter comprises an agricultural pesticide, fertilizer or adjuvant.

34. The method of claim 31, wherein the applicator bin comprises a bin of an agricultural planter.

35. The method of claim 31, wherein the step of operating comprises pneumatically transporting the particulate matter in a flow of gas through the transport conduit of the device; and returning the flow of gas, less the dispensed particulate matter, to the device.

36. The method of claim 35, wherein the step of operating further comprises filtering the returned flow of gas in the device.

37. The method of claim 29, wherein the device comprises a portable dispensing unit containing the storage bin and metering device, and a portable power unit containing a blower, the method including the step of connecting the power and dispensing units connected with at least one flexible air line.

38. A method of metering and dispensing particulate matter from storage bin directly into an applicator bin, the method comprising:

providing a device comprising
a sealed storage bin containing a quantity of particulate matter in bulk form;
a meter connected to the storage bin for controllably releasing a desired amount of the particulate matter from the storage bin;
a pneumatic transport conduit for suspending the released particulate matter in a flow of gas and transporting the suspended matter to an applicator bin;
a coupler disposed at a distal end of the conduit, the coupler adapted to provide a sealed connection between the conduit and the applicator bin as transported particulate matter is dispensed from the conduit into the applicator bin through the coupler; wherein the pneumatic transport conduit comprises a flexible duct extending from the meter to said coupler, such that the flow of gas and suspended matter are ejected through said coupler directly into the applicator bin; and
a return duct for returning the flow of gas from the applicator bin to the meter through the coupler;
transporting said device to a desired location;
connecting the coupler of the device to an applicator bin to form a sealed connection; and
operating the device to dispense a metered amount of the particulate matter directly into the applicator bin through the sealed connection.

39. The method of claim 38, wherein operating the device includes entering into a controller of the device an indication of a desired quantity of particulate matter to be dispensed.

40. The method of claim 38, wherein the particulate matter comprises an agricultural pesticide, fertilizer or adjuvant.

41. The method of claim 38, wherein operating the device includes entering into a controller of the device an indication of the density of the particulate matter to be released.

42. The method of claim 38, wherein the applicator bin comprises a bin of an agricultural planter.

43. The method of claim 38, wherein operating the device comprises pneumatically transporting the particulate matter in a flow of gas through the transport conduit of the device; and
returning the flow of gas, less the dispensed particulate matter, to the device.

44. The method of claim 43, wherein operating the device further comprises filtering the returned flow of gas in the device.

45. The method of claim 38, wherein the device comprises a portable dispensing unit containing the storage bin and metering device, and a portable power unit containing a blower, the method including connecting the power and dispensing units connected with at least one flexible air line.

46. A method of metering and dispensing particulate matter from a storage bin directly into an applicator bin, the method comprising:

providing a device having
a storage bin containing a quantity of particulate matter in bulk form;
a meter connected to the storage bin for controllably releasing a desired amount of the particulate matter from the storage bin, the meter comprising
an airlock having a multi-vaned metering rotor;
an airlock drive motor for rotatably driving the metering rotor; and
a controller for controlling the rotation of the airlock drive motor to release a desired quantity of the particulate matter from the storage bin;
a pneumatic transport conduit for suspending the released particulate matter in a flow of gas and transporting the suspended matter to an applicator bin; and
a coupler disposed at a distal end of the conduit, the coupler adapted to provide a sealed connection between the conduit and the applicator bin as transported particulate matter is dispensed from the conduit into the applicator bin through the coupler;
transporting said device to a desired location;
connecting the coupler of the device to an applicator bin to form a sealed connection; and
operating the device to dispense a metered amount of the particulate matter directly into the applicator bin through the sealed connection.

47. The method of claim 46, wherein operating the device includes entering into a controller of the device an indication of a desired quantity of particulate matter to be dispensed.

48. The method of claim 46, wherein the particulate matter comprises an agricultural pesticide, fertilizer or adjuvant.

49. The method of claim 46, wherein the device includes entering into a controller of the device an indication of the density of the particulate matter to be released.

50. The method of claim 46, wherein the applicator bin comprises a bin of an agricultural planter.

51. The method of claim 46, wherein operating the device comprises pneumatically transporting the particulate matter in a flow of gas through the transport conduit of the device; and
returning the flow of gas, less the dispensed particulate matter, to the device.

52. The method of claim 51, wherein operating the device further comprises filtering the returned flow of gas in the device.

53. The method of claim 46, wherein the device comprises a portable dispensing unit containing the storage bin and metering device, and a portable power unit containing a blower, the method including connecting the power and dispensing units connected with at least one flexible air line.

54. A method of metering and dispensing particulate matter from a storage bin directly into an applicator bin, the method comprising:

provi ding a device having
- a storage bin containing a quantity of particulate matter in bulk form;
- a meter connected to the storage bin for controllably releasing a desired amount of the particulate matter from the storage bin;
- a pneumatic transport conduit for suspending the released particulate matter in a flow of gas and transporting the suspended matter to an applicator bin;
- a coupler disposed at a distal end of the conduit, the coupler adapted to provide a sealed connection between the conduit and the applicator bin as transported particulate matter is dispensed from the conduit into the applicator bin through the coupler; and
- a flow sensor responsive to air flow along the conduit, for enabling operation of the meter only in the presence of a desired amount of air flow;

transporting said device to a desired location;

connecting the coupler of the device to an applicator bin to form a sealed connection; and operating the device to dispense a metered amount of the particulate matter directly into the applicator bin through the sealed connection.

* * * * *

UNITED STATES PATENT AND TRADEMARK OFFICE
CERTIFICATE OF CORRECTION

PATENT NO. : 6,273,153 B1
DATED : August 14, 2001
INVENTOR(S) : Frank G. Reinsch It is certified that error appears in the above-identified patent and that said Letters Patent is hereby corrected as shown below:

<u>Title page,</u>
Item [56], References Cited, under U.S. PATENT DOCUMENTS:

2,674,206    delete "9/1954"
                           insert -- 9/1948 --

3,030,153    delete "4/1962"
                           insert -- 6/1959 --

FOREIGN PATENT DOCUMENTS:
At reference 583959    delete "(SU)"
                                  insert -- (AT) --

<u>Column 10,</u>
Line 11, after the words "applicator bin" insert -- as transported particulate matter is dispensed from the conduit into the applicator bin --

Signed and Sealed this

Sixth Day of August, 2002

Attest:

JAMES E. ROGAN
Attesting Officer                Director of the United States Patent and Trademark Office